United States Patent [19]

Toya

[11] Patent Number: 5,294,274
[45] Date of Patent: Mar. 15, 1994

[54] METHOD FOR WINDING BELT-SHAPED MEMBER

[76] Inventor: Hiroki Toya, c/o Technical Center, Bridgestone Corporation, 1-1, Ogawahigashi-Cho, 3-Chome, Kodaira City, Tokyo, Japan

[21] Appl. No.: 765,503

[22] Filed: Sep. 26, 1991

Related U.S. Application Data

[63] Continuation of Ser. No. 446,752, Dec. 6, 1989, abandoned.

[30] Foreign Application Priority Data

Apr. 18, 1989 [JP] Japan ................................ 1-98570
Oct. 23, 1989 [JP] Japan ................................ 1-275624

[51] Int. Cl.$^5$ ................................................ B29D 30/16
[52] U.S. Cl. ........................................ 156/133; 156/64; 156/121; 156/134; 156/129; 156/229; 156/406.6
[58] Field of Search ............... 156/123, 124, 130, 133, 156/134, 406.4, 128.1, 128.6, 229, 406.6, 121, 129, 64, 110.1, 118

[56] References Cited

U.S. PATENT DOCUMENTS

| | | | |
|---|---|---|---|
| 3,325,072 | 6/1967 | Black et al. | 156/406.4 |
| 3,393,112 | 7/1968 | Brown | 156/123 |
| 3,418,191 | 12/1968 | Dieckmann et al. | 156/397 |
| 3,892,616 | 7/1975 | Crites | 156/123 |
| 3,993,530 | 11/1976 | Henley et al. | 156/405.1 |
| 4,049,486 | 9/1977 | Henley | 226/184 |
| 4,163,685 | 8/1979 | Kubinski | 156/405.1 |
| 4,398,988 | 8/1983 | Mullender | 156/405.1 |
| 4,465,536 | 8/1984 | Makino et al. | 156/133 |
| 4,470,866 | 9/1984 | Satoh et al. | 156/406.6 |
| 4,473,427 | 9/1984 | Irie | 156/396 |
| 4,747,904 | 5/1988 | Okuyama et al. | 156/403 |
| 4,804,426 | 2/1989 | Okuyama et al. | 156/128.1 |
| 4,900,382 | 2/1990 | Klose | 156/128.6 |

FOREIGN PATENT DOCUMENTS

| | | | |
|---|---|---|---|
| 1904481 | 8/1970 | Fed. Rep. of Germany . | |
| 1285727 | 4/1961 | France . | |
| 54-131681 | 10/1979 | Japan | B29H 17/02 |
| 56-141867 | 11/1981 | Japan | B05B 5/02 |
| 57-105336 | 3/1982 | Japan | B29H 17/20 |
| 57-181840 | 11/1982 | Japan | B29H 17/20 |
| 57-181841 | 11/1982 | Japan | B29H 17/20 |
| 58-42445 | 3/1983 | Japan | B29H 17/20 |
| 59-207227 | 11/1984 | Japan | B29H 17/20 |
| 60-44448 | 3/1985 | Japan | B65H 20/02 |
| 60-54841 | 3/1985 | Japan | B29D 30/30 |
| 60-79938 | 5/1985 | Japan | B29D 30/30 |
| 62-3070 | 1/1987 | Japan | B65H 23/02 |
| 62-11633 | 1/1987 | Japan | B29D 30/30 |
| 62-83966 | 4/1987 | Japan | B65H 23/032 |
| 62-119028 | 5/1987 | Japan . | |
| 62-236728 | 10/1987 | Japan | B29D 30/30 |
| 63-93426 | 4/1988 | Japan | B21C 47/26 |
| 63-93598 | 4/1988 | Japan | B26D 7/32 |
| 63-306151 | 12/1988 | Japan | B65H 19/28 |
| 64-16630 | 1/1989 | Japan | B29C 53/04 |
| 0698778 | 11/1979 | U.S.S.R. | 156/123 R |

*Primary Examiner*—Michael W. Ball
*Assistant Examiner*—Francis J. Lorin

[57] ABSTRACT

A method of winding a belt-shaped member is used in winding a tire member around a forming drum. A position of a leading end of a tire member is detected to obtain a shifted distance of the leading end relative to the forming drum. The leading end is then transferred to the forming drum, while the leading end is being moved in a width direction to make zero the shifted distance. The leading end is pressed against the forming drum, while the leading end is brought into coincidence with a reference position of the forming drum. The forming drum is then rotated during which the tire member is supplied onto the forming drum. A position of a trailing end of the tire member is detected to obtain a shifted distance of the trailing end relative to the reference position of the forming drum. The trailing end is the supplied onto the rotating forming drum, while the trailing end is moved in a width direction to make zero the shifted distance of the trailing end. In this manner the tire member is completely wound about the forming drum with the leading end being snugly coincident with the trailing end.

3 Claims, 4 Drawing Sheets

FIG_4

METHOD FOR WINDING BELT-SHAPED MEMBER

This is a continuation of application No. 07/446,752 filed Dec. 6, 1989, now abandoned.

BACKGROUND OF THE INVENTION

This invention relates to a method for winding a belt-shaped member around a tire forming drum.

As a method and an apparatus hitherto used for winding a belt-shaped member, those disclosed, for example, in U.S. Pat. No. 3,411,975 have been known. The apparatus includes a conveyor for supplying a belt-shaped member, for example, a tread rubber onto a tire forming drum and a plurality of rollers for bringing a center of a width of a belt-shaped member on the conveyor into a coincidence with a reference position of the tire forming drum, for example, a center of the drum in width directions. While the center of the belt-shaped member in the width directions is caused to be coincident with the reference position of the forming drum by means of the rollers, the belt-shaped member is supplied onto the forming drum to wind the member around the forming drum.

In such a winding method and an apparatus, however, although the center of the belt-shaped member along its longitudinal direction can be securely in coincidence with the reference position of the forming drum. A leading end and a trailing end of the belt-shaped member in the longitudinal directions are restrained from moving around only to a lesser extent so that the leading and trailing ends are likely to be shifted even when they are brought into coincidence with the reference position of the forming drum. As a result, the leading and trailing ends of the belt-shaped member wound around the forming drum are slightly shifted to lower the uniformity of a produced tire. In order to prevent such a fact, the shifting of the ends in the width directions is often corrected manually by an operator. However, such a manual correction will unavoidably lower the operation efficiency.

SUMMARY OF THE INVENTION

It is an object of the invention to provide an improved method for winding a belt-shaped member around tire forming drum, which eliminate all the disadvantages of the prior art and improve the operation efficiency in tire building operations and the uniformity of tires to be produced.

In order to achieve this object, a method of winding a belt-shaped member around a drum according to the invention comprises steps of detecting a position of a leading end of a belt-shaped member in width directions to obtain a shifted distance of the leading end relative to a reference position on a forming drum, transferring the leading end of the belt-shaped member to the forming drum, while moving the leading end in a width direction to make zero the shifted distance, pressing the leading end of the belt-shaped member against the forming drum, while bringing the position of the leading end in the width directions into coincidence with the reference position of the forming drum, rotating the forming drum during which the belt-shaped member is supplied onto the forming drum to wind the belt-shaped member around a majority of the forming drum, detecting a position of a trailing end of the belt-shaped member in the width directions to obtain a shifted distance of the trailing end in the width directions relative to the reference position of the forming drum, and supplying the trailing end of the belt-shaped member onto the rotating forming drum, while moving the trailing end in a width direction to make zero the shifted distance of the trailing end to wind it around the forming drum with the position of the trailing end in the width directions being in coincidence with the reference position of the forming drum, with resulting coincidence of the positions of the leading and trailing ends of the belt-shaped member in the width directions.

In a second aspect of the invention, a method of winding a belt-shaped member around a drum comprises steps of detecting a position of a leading end of a belt-shaped member in width directions, transferring the leading end to a forming drum and pressing it against the forming drum, rotating the forming drum during which the belt-shaped member is supplied onto the forming drum to wind the belt-shaped member around a majority of the forming drum, detecting a position of a trailing end of the belt-shaped member in the width directions to obtain a shifted distance between the positions of the leading and trailing ends in the width directions, and supplying the trailing end of the belt-shaped member onto the rotating forming drum, while moving the trailing end in a width direction to make zero the shifted distance between the positions of the leading and trailing ends to wind the trailing end around the forming drum with a coincidence of the positions of the leading and trailing ends of the belt-shaped member.

In a third aspect of the invention, a method of winding a belt-shaped member around a drum comprises steps of transferring a leading end of a belt-shaped member, while bringing the leading end into coincidence with a reference position of a forming drum to press the leading end against the forming drum, rotating the forming drum during which the belt-shaped member is supplied onto the forming drum to wind the belt-shaped member around a majority of the forming drum, detecting a position of a trailing end of the belt-shaped member a in width directions to obtain a shifted distance in the width directions between the position of the trailing end in the width directions and the reference position of the forming drum, and supplying the trailing end of the belt-shaped member onto the rotating forming drum, while moving the trailing end in a width direction to make zero the shifted distance between the position of the trailing end and the reference position of the forming drum to wind the trailing end around the forming drum with a coincidence of the position of the trailing end in the width directions and the reference position of the forming drum, with resulting coincidence of the positions of the leading and trailing ends of the belt-shaped member in the width directions.

An apparatus for winding a belt-shaped member around a drum according to the invention comprises a conveyor for supplying a belt-shaped member to a forming drum, coincidence means for bringing positions of the belt-shaped member in width directions into coincidence with a reference position of the forming drum, detecting sensors for detecting positions of a leading and a trailing end of the belt-shaped member in the width directions, grasping units capable of grasping the leading and trailing ends of the belt-shaped member and movable between the conveyor and the forming drum and in the width directions of the belts-shaped member, and control means for causing the grasping units to move in the width directions on the basis of detected results of the detecting sensors to correct at least a position of the trailing end of the belt-shaped member in the width directions to render positions of the leading and trailing ends of the belt-shaped member in the width directions coincident with each other.

It is assumed that a belt-shaped member is arranged on the conveyor. A position of a leading end of the belt-shaped member in width directions is detected by the detecting sensor and the detected result is fed to the control means. A shifted distance between the position of the leading end in the width direction and the reference position of the forming drum is obtained by the control means.

After the leading end of the belt-shaped member has been grasped by the grasping units, the units are moved to the forming drum so that the leading end of the belt-shaped member is transferred to the forming drum. At this time, the grasping units are moved in a width direction of the belt-shaped member on the basis of signals from the control means to correct the position of the leading end of the belt-shaped member in the width directions to null the shifted distance in the width direction.

As a result, the leading end of the belt-shaped member is in coincidence with the reference position of the forming drum and is pressed against the forming drum. Thereafter, the belt-shaped member on the conveyor is supplied onto the forming drum being rotated to wind the belt-shaped member around a majority of the forming drum. Since the center of the supplied belt-shaped member in the width directions is made exactly coincident with the reference position of the forming drum, it is not needed to correct the positions of the center portion of the belt-shaped member in longitudinal directions.

Thereafter, a position of a trailing end of the belt-shaped member in width directions is detected by the detecting sensor in the similar manner to that of the leading end of the belt-shaped member. The detected result is fed to the control means to obtain a shifted distance between the position of the trailing end of the member in the width directions and the reference position of the forming drum. After the trailing end of the belt-shaped member has been grasped by the grasping units, the grasping units are moved toward the forming drum so that the belt-shaped member is supplied to the forming drum, while the drum is being rotated.

At this time, the grasping units are moved in a width direction on the basis of signals from the control means to correct the position of the trailing end of the member in the width directions to null the shifted distance in the width direction. As a result, the trailing end of the member is wound around the forming drum in a manner that the position of the trailing end in the width directions is coincident with the reference position of the drum.

When the belt-shaped member has ben wound one rotation around the forming drum, the winding is completed. In this case, as the positions of the leading and trailing ends of the belt-shaped member in the width directions are brought into coincidence with the reference position of the forming drum, these positions are coincidence with each other without requiring any manual correction. As a result, the uniformity of produced tires is improved.

Moreover, a belt-shaped member may be wound around the forming drum in the following manner according to the invention. First, a position of a leading end of a belt-shaped member in width directions is directed by means of the detecting sensor and the detected result is fed to the control means which temporarily memorizes the position of the leading end in the width direction.

Then, after the leading end of the belt-shaped member has been grasped by the grasping units, the units are moved toward the forming drum so that the leading end is transferred onto the forming drum without changing the position of the leading end in the width directions and pressed against the forming drum.

Thereafter, the belt-shaped member on the conveyor forming drum is supplied to the forming drum, while the drum is rotated to wind the member around a majority of the forming drum. A position of the trailing end of the belt-shaped member in the width directions is then detected by the detecting sensor in the same manner as above described. The detected result is then fed to the control mean to obtain a shifted distance in the width direction between the memorized position of the leading end and the detected position of the trailing end in the width directions.

Then, after the trailing end of the member has been grasped by the grasping units, the units are moved toward the forming drum to supply the trailing end to the forming drum, while the drum is rotated. At this time, the grasping units are moved in the width direction on the basis of signals from the control means to correct the position of the trailing end in the width direction to null the shifted distance in the width direction.

As a result, the trailing end of the belt-shaped member is wound around the forming drum in a manner that the position of the trailing end of the belt-shaped member in the width direction is brought into coincidence with the position of the leading end of the belt-shaped member. When the belt-shaped member has been wound one evolution around the forming drum, the winding is completed. In this case, the positions of the leading and trailing ends of the belt-shaped member in the width directions are coincident with each other without requiring any manual correction, with the result that the uniformity of produced tires is improved.

According to the invention, moreover, a belt-shaped member may be wound around the forming drum in the following manner. First, after a leading end of a belt-shaped member has been grasped by the grasping units, the units are moved toward the forming drum to transfer the leading end and to press it against the forming drum. During transferring, the position of the leading end in the width directions is brought into coincidence with the reference position of the forming drum by means of the coincidence means.

Thereafter, the belt-shaped member on the conveyor is supplied onto the forming drum, while the drum is rotated to wind the belt-shaped member on a majority of the forming drum. A position of a trailing end of the belt-shaped member in the width directions is then detected by the detecting sensor and the detected result is fed to the control means to obtain a shifted distance in the width direction between the position of the trailing end in the width direction and the reference position of the forming drum.

Then, after the trailing end of the belt-shaped member has, been grasped by the grasping units, the units are move toward the forming drum to supply the belt-shaped member to the forming drum, while the drum is rotated. In this case, the grasping units are moved in the width direction on the basis of signals from the control means to correct the position of the trailing end to null the shifted distance in the width direction.

As a result, the trailing end of the belt-shaped member is wound around the forming drum so that the position of the trailing end in the width direction is brought into coincidence with the reference position of the forming drum. When the belt-shaped member has been wound one revolution around the forming drum, the winding is completed. In this case, since the positions of the leading and trailing ends of the belt-shaped member have been in coincidence with the reference position of the forming drum, the positions of the leading and trailing ends in the width directions are coincident with each other without requiring any manual correction. As a result, the uniformity of produced tires is improved.

The invention will be more fully understood by referring to the following detailed specification and claims taken in connection with the appended drawings.

DETAILED EXPLANATION OF THE PREFERRED EMBODIMENTS

Figure 1:
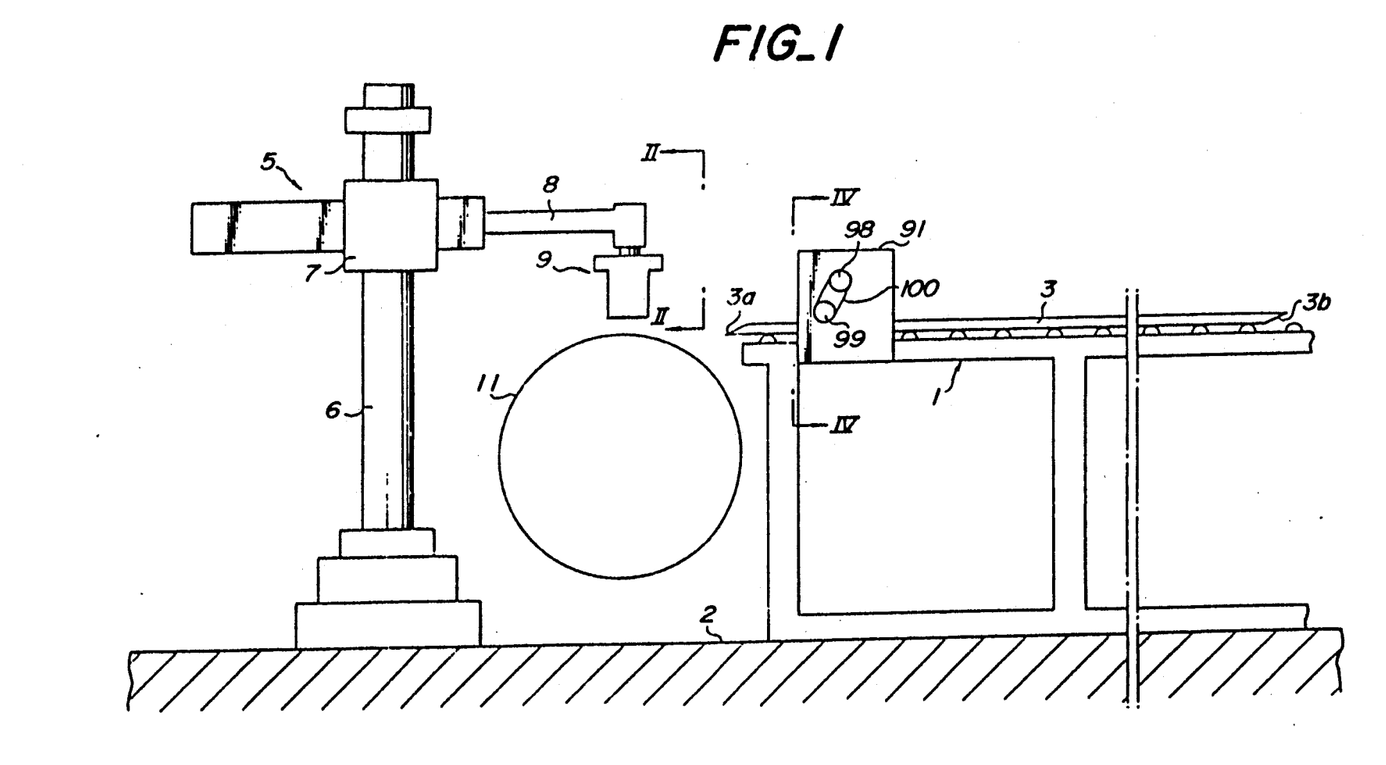
FIG. 1 is a schematic front elevation illustrating one embodiment of the invention.
Figure 2:
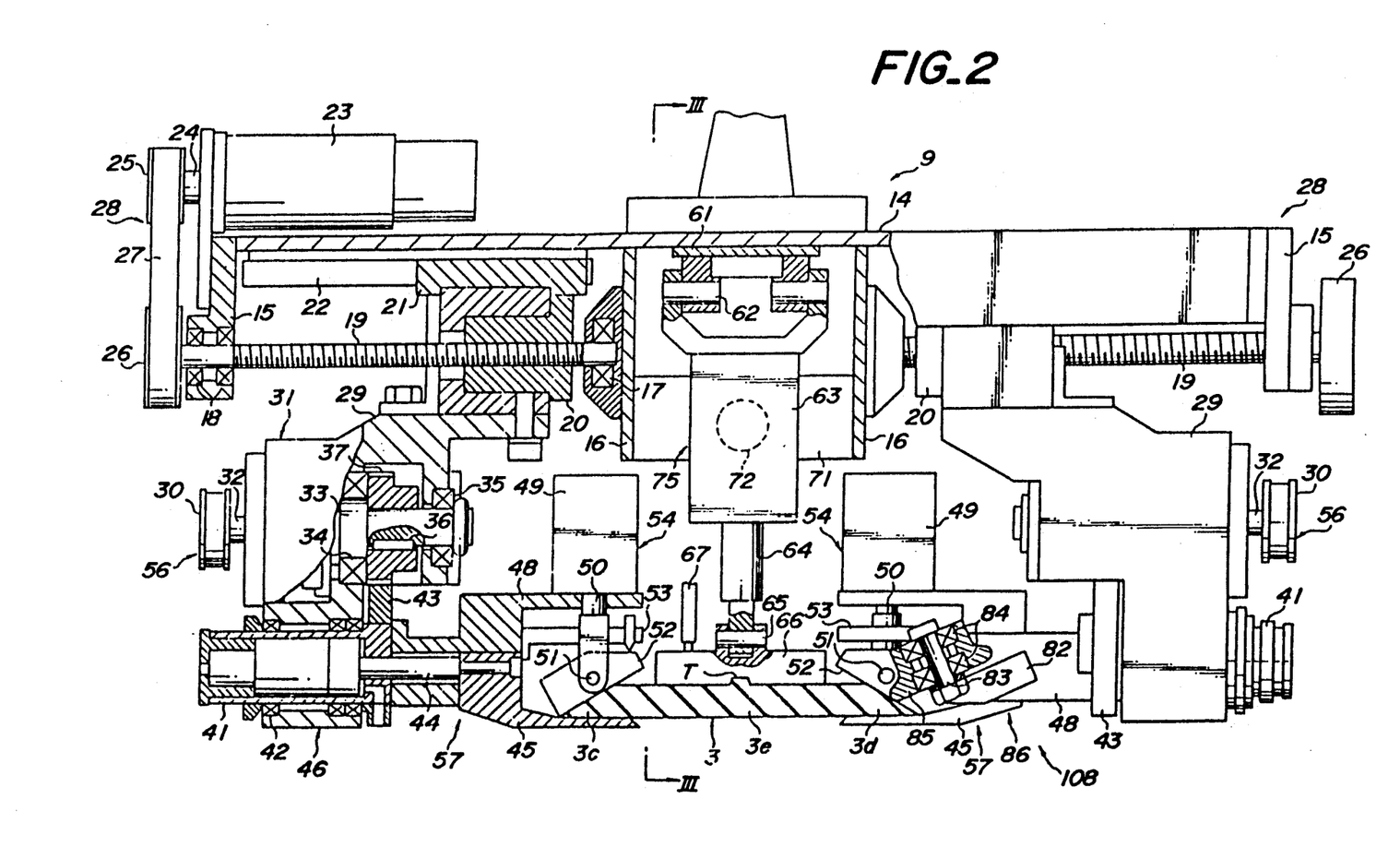
FIG. 2 is a side view, partially broken away, of the apparatus shown in FIG. 1 viewed in a direction shown in arrows II in FIG. 1.
Figure 4:
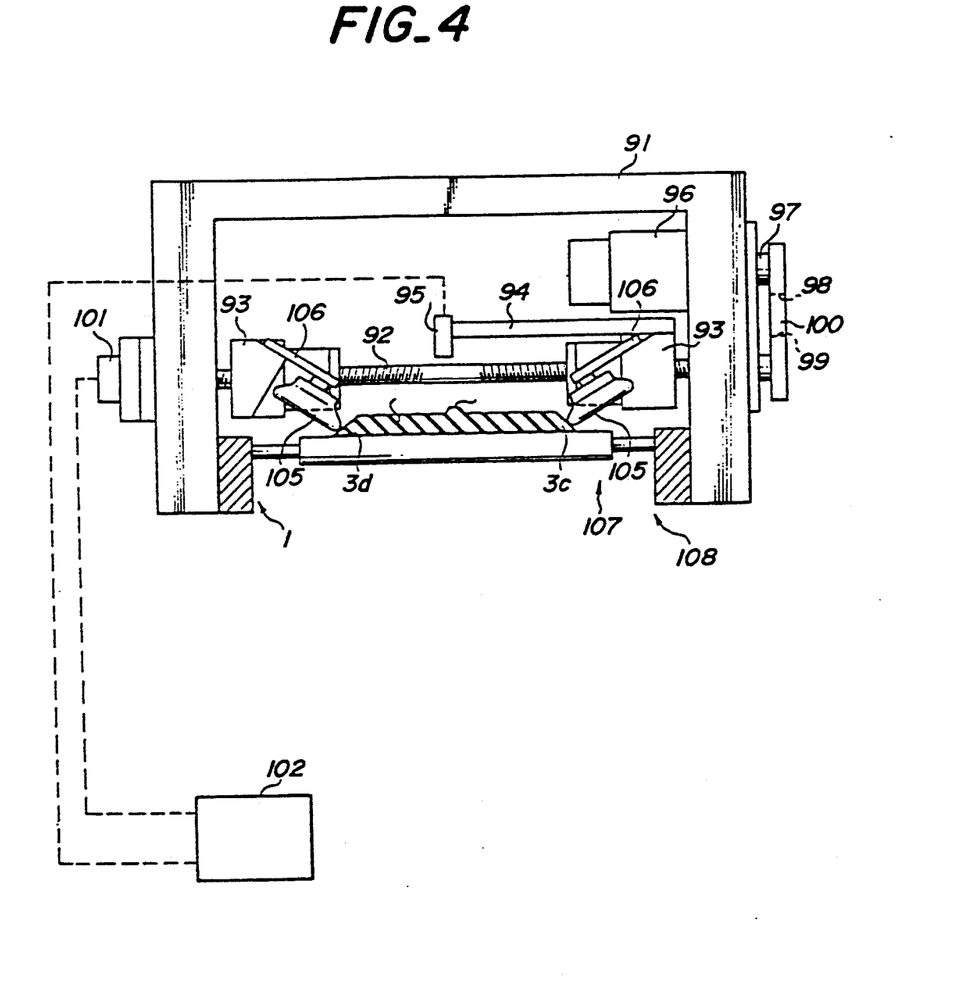
FIG. 4 is a sectional view of the unit taken along the line IV—IV in FIG. 1.

Referring to FIG. 1, on a floor 2 is arranged a conveyor 1 for supplying belt-shaped members 3, for example, tread rubbers cut in a predetermined length forwardly or to a forming drum later described. In this case, the term "forward" means the direction into which the belt-shaped member 3 is fed toward the forming drum. The belt-shaped member 3 is formed on an upper surface along a width center line with a ridge T as a mark extending in a longitudinal direction of the belt-shaped member 3 (FIGS. 2 and 4). The ridge T may be a straight groove, a line drawn by a coating, intersecting edges between the upper surface and side edges or the like, so long as it can serve as a mark indicating specified positions in width direction of the belt-shaped member 3. Moreover, the mark T may be positioned spaced from the center of the member by a predetermined distance. The belt-shaped member 3 may be long and continuous, in which case it may be cut when a predetermined length of the member 3 has been supplied.

Forward of the conveyor 1 is arranged a robot 5 comprising a vertical post 6, a bracket 7 liftably supported by the post 6, an arm 8 having a hand at its end for handling the belt-shaped member 3 and supported by the post 6 movably in forward and rearward directions. Between the conveyor 1 and the robot 5 is arranged a forming drum 11 controllable in rotating number and rotating speed. An axis of the forming drum 11 extends horizontally in a direction substantially perpendicular to the feeding direction of the belt-shaped member 3.

With this arrangement, the hand 9 is movable two-dimensionally in a plane perpendicular to the rotating axis of the forming drum 11. In this manner, a grasping unit latter described is caused to move between the conveyor 1 and the forming drum 22. In this case, the hand 9 may be moved three-dimensionally by providing the robot 5 with mobility in the width directions of the belt-shaped member 3 and rotational capability.

Figure 3:
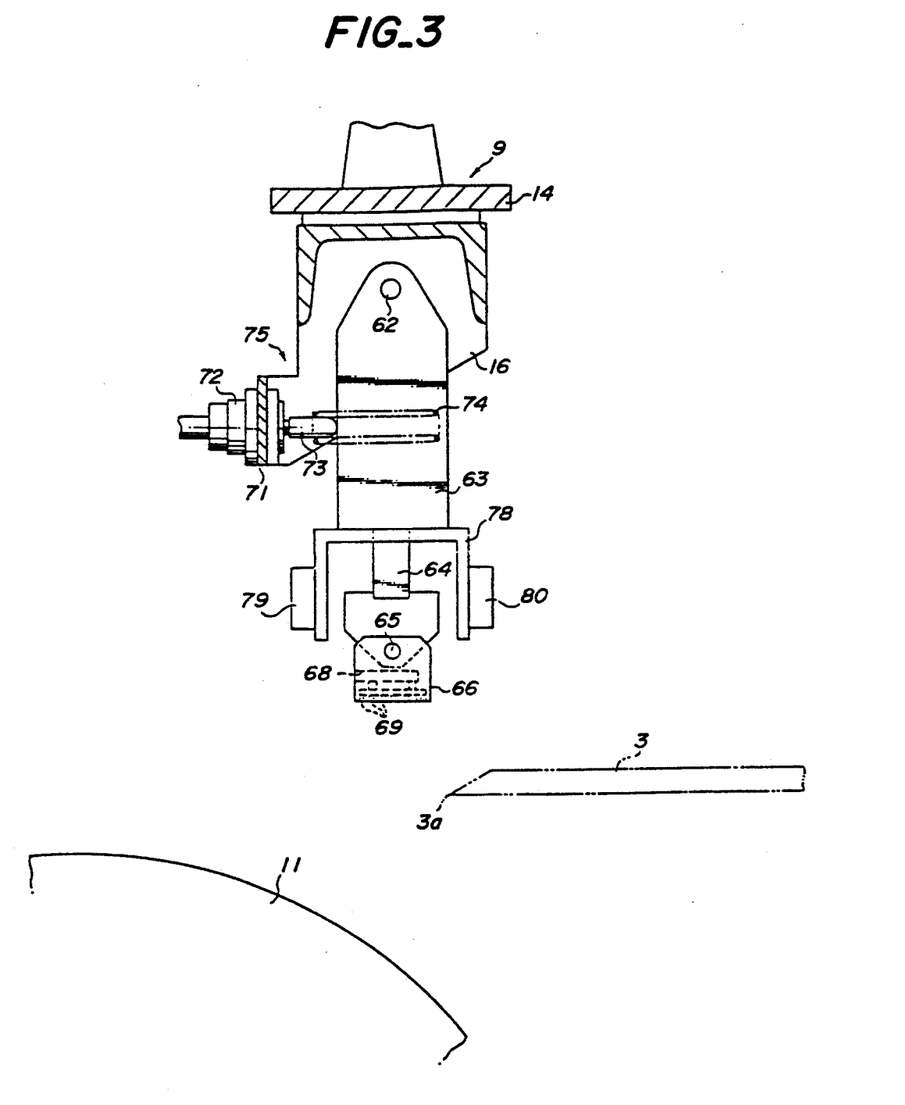
FIG. 3 is a sectional view of the unit taken along the line III—III in FIG. 2.

As shown in detail in FIGS. 2 and 3, the hand 9 comprises a hand main body 14 extending in the width directions of the material 3 and having at both ends auxiliary plates 15 fixed thereto. A pair of vertical center plates 16 are fixed to a center portion of the hand main body 14. A pair of screw shafts 19 formed with screw threads in reverse directions and extending in the width directions of the belt-shaped member 3 are rotatably supported with their ends by bearings 17 provided on the center plates 16 and bearings 18 provided on the auxiliary plates 15. Screw blocks 20 are threadedly engaged on the screw shafts 19, respectively. Guide blocks 21 are fixed to the screw blocks 20 and slidably engage a pair of rails 22. The rails 22 extend in parallel with the screw shafts 19 and are mounted on a lower surface of the hand main body 14.

Onto both ends of the hand main body 14 are mounted motors 23 (only one shown in FIG. 2), respectively, whose output shafts 24 have pulleys 25 fixed thereto. A timing belt or cog belt 27 extends about each of the pulleys 25 and each of pulleys 26 fixed to the screw shafts 19. When the motors 23 are energized, the screw blocks 20 move through equal distances toward or away from each other in opposite directions or in the same directions in synchronism with each other.

The screw shafts 19, the screw blocks 20, the guide blocks 21, the rails 22, the motors 23, the pulleys 25 and 26 and the timing belts 27 form as a whole moving means 28 for moving the grasping units later described in the width directions of the belt-shaped member 3.

In a movable unit fixed to each of the screw blocks 20 is enclosed a speed reduction device 31 whose input shaft 32 having a pulley 30 fixed thereto which in turn is connected to a motor (not shown). An output shaft 33 of the speed reduction device 31 is rotatably supported in bearings 34 and 35 in the movable unit 29 and has a gear 37 fixed thereto by means of a key 36. A cylinder 41 in parallel with the screw shaft 19 is rotatably supported by bearings 42 in the movable unit 29 below the speed reduction device 31. A gear member 43 is formed with gear teeth in one third of its circumference in opposition to the gear 37 and adapted to engage therewith and is fixed to a rod end of the cylinder 41.

A lower pawl 45 is fixed to an end of a piston rod of each of the cylinders 41 so as to engage under the surface of each of width edges 3c and 3d of the belt-shaped member 3. The lower pawls 45 move in the width directions of the belt-shaped member 3 toward and away from each other when the piston rods of the cylinders 41 extend and retracted. The cylinders 41 and the piston rods 44 form as a whole toward and away mechanisms 46.

To a rod end of each of the cylinders 41 is fixed a rocking block 48 to which is fixed a vertical cylinder 49. To an end of a piston rod 50 of each of the cylinders 49 is rotatably connected an upper pawl 52 forming a paired relation with the lower pawl 45. The upper pawls 52 are moved toward and away from the lower pawls 45 by means of the cylinders 49, respectively, to clamp the width edges 3c and 3d of the belt-shaped member 3 from under and above. Widths of the upper pawls 52 are wider than those of the lower pawls 45. Stoppers 53 fixed to the piston rods 50 serve to stop the rotation of the upper pawls 52. The cylinders 49 and the stoppers 53 form as a whole closing and opening mechanisms 54 for moving the upper pawls 52 toward and away from the lower pawls 45 to close and open these pawls.

The motors (not shown), the speed reduction devices 41, the gears 37, the gear members 43 and rocking blocks 48 form as a whole rocking mechanisms 56 for rocking or swinging the upper and lower pawls 52 and 45 in unison in vertical planes perpendicular to the rotating a is of the forming drum 11 about axes of the cylinders 41. Moreover, a pair of grasping units 57 as a whole are constructed by the movable units 29, the lower pawls 45, the toward and away mechanisms 46, the upper pawls 52, the closing and opening mechanisms 54 and the rocking mechanisms 56.

A bracket 61 is fixed to the hand main body 14 between the center plates 16. A head end of a cylinder 63 is pivotally connected by a pin 62 to the bracket 61. A pressing member 66 is pivotally connected by a pin 65 to a lower end of a piston rod 64 of the cylinder 63. As shown in FIG. 3, the pressing member 66 is formed therein with passages 68 which is connected through a pipe 67 (FIG. 2) to a vacuum source (not shown) and communicate with a number of suction openings 69 opening at a lower surface of the pressing member 66.

With this arrangement, the pressing member 66 is positioned between the upper pawls 52 and is able to hold the belt-shaped member 3 at its center 3e by suction on its upper surface. When the piston rod 64 of the cylinder 63 is extended, the pressing member 66 is moved in a direction of thickness of the belt-shaped member 3 so as to press the center 3e of the belt-shaped member 66 against the forming drum 11.

The pair of center plates 16 is connected by a connecting plate 71 to which is connected a pin cylinder 72 having a piston rod 73. A spring 74 having ends anchored to the cylinder 63 and the center plates 16 urges the cylinder 63 toward the pin cylinder 72. When a piston rod 73 of the pin cylinder 72 extends, the cylinder 63 is rocked or swung about the pin 62 onto a side of the conveyor 1 against a spring force of the spring 74. The cylinder 63, the pin cylinder 72 and the spring 74 form as a whole urging means for moving the pressing member 66 toward the forming drum 11 to press the center 3e of the belt-shaped member 3 against the forming drum 11.

A bracket 78 is fixed to a lower end of the cylinder 63 and provided on the side of the robot 5 with a leading end sensor 79 secured thereto for detecting a leading end 3a of the belt-shaped member 3 and on the side of the conveyor 1 with a trailing end sensor 80 secured thereto for detecting a trailing end 3b of the belt-shaped member 3. These leading and trailing end sensors 79 and 80 perform their detection at the center of the belt-shaped member 3.

A shaft 83 is fixed through a bracket 82 to each of the rocking blocks 48. A roller 85 is rotatably supported through bearings 84 by the shaft 83. The rollers 85 urge surfaces of side edges 3c and 3d of the belt-shaped member 3 inwardly in its width directions so as to bring positions of the member 3 into coincidence with reference position of the forming drum 11 or a center of axis of the forming drum 11. The bracket 82, the shafts 83, the bearings 84 and the rollers 85 form as a whole a first coincidence mechanism 86 for bringing the belt-shaped member 3 into coincidence with the reference position of the forming drum 11.

Referring to FIGS. 1 and 4, a gate-shaped frame 91 is provided which has a lower end fixed to a front end of the conveyor 1 and a screw shaft 92 rotatably supported thereby extending in the width directions of the belt-shaped member 3. The screw shaft 92 is formed with two sets of screw threads on its halves in reverse directions. A pair of movable blocks 93 are threadedly engaged on the two sets of the screw threads of the screw shaft 92, respectively. A guide rod (not shown) is slidably inserted into the movable blocks 93 and fixed to the frame 92 to extend in parallel with the screw shaft 92.

To one of the movable blocks 93 is fixed a bottom of a support bar 94 extending in parallel with the screw shaft 92 to the proximity of a mid point between the movable blocks 93. To a free end of the support bar 94 is fixed a detecting sensor 95 as reflection type photoelectric sensor or the like for detecting the ridge T of the belt-shaped member 3. The detecting sensor 95 detects the ridge T of the belt-shaped member 3 to detect its width positions and feeds the detected results to control means later described.

Onto the frame 91 is mounted a motor 96 whose output shaft 97 has a pulley 98 fixed thereto. A timing belt or cog belt 100 extends about the pulley 98 and a pulley 99 fixed to one end of the screw shaft 92. As a result, when the motor 96 is energized to rotate the screw shaft 92, the movable blocks 93 move equal distances toward and away from each other so that the detecting sensor 95 moves in the width directions of the belt-shaped member 3.

An encoder 101 is connected to the other end of the screw shaft 92 and serves to convert of the screw shaft 92 into pulses which are fed to control means 102. The control means 102 serves to obtain present positions of the detecting sensor 92 on the basis of the pulses fed from the encoder 101 and shifted distances of the belt-shaped member 3 in its width directions on the basis of the detected results of the detecting sensor 95, the control means 102 controls operations of the conveyor 1, the robot 5, the forming drum 11 and the like.

Plural sets of rollers 105 are rotatably supported through brackets 106 by the movable blocks 93 to urge surfaces of both the side edges 3c and 3d of the belt-shaped member 3 in its width directions in the same manner as in the rollers 85 so that the positions of the belt-shaped member 3 in its width directions are caused to be substantially coincident with the reference position of the forming drum 11. The rollers 105 and the brackets 106 form as a whole a second coincidence mechanism 107 for causing the positions of the belt-shaped member 3 in its width directions substantially into coincidence with the reference position of the forming drum 11. The first and second coincidence mechanisms 86 and 107 form as a whole coincidence means 108.

The operation of the apparatus of the first embodiment of the invention will be explained hereinafter.

First, the belt-shaped member 3 is transferred on the conveyor 1 until its leading end 3a arrives at a predetermined position in the proximity of the forming drum 11. In this case, the leading end 3a of the belt-shaped member 3 is only slightly restrained. Therefore, even if the position of the belt-shaped member 3 in its width directions is brought into coincidence with the reference position of the forming drum 11, the belt-shaped member 3 is readily deformed in the width directions, with the result that the position of the leading end of the belt-shaped member 3 in the width directions arranged on the conveyor 1 is frequently shifted relative to the reference position of the forming drum 11.

The motor 96 is then energized to rotate the screw shaft 92 so as to move the movable blocks 93 away from each other. With such movements of the movable blocks 93, the detecting sensor 95 moves in the width direction of the belt-shaped member 3 to detect its ridge T or a position of its leading end in the width directions when the detecting sensor 95 have arrived immediately above the ridge T of the member 3. The detected result is fed to the control means 102. In this case, moreover, rotations of the screw shaft 92 are converted into pulses by the encoder 101, which are then fed into the control means 102 to obtain a position of the detecting sensor 95 itself.

Thereafter, the control means 102 detects a shifted distance of the leading end of the belt-shaped member 3 in its width direction relative to the reference position of the forming drum 11 on the basis of the position of the belt-shaped member 3 in the width directions fed from the, detecting sensor 95 and the reference position of the forming drum 11 previously memorized. The motor, 96 is then energized to rotate the screw shaft 92 in a direction opposite to that above described to move the movable blocks 93 toward each other. As a result, the rollers 105 are urged against surfaces of the side edges of the belt-shaped member 3.

The robot 5 is actuated to cause the hand 9 to approach the leading end 3a of the belt-shaped member 3. The movement of the hand 9 is stopped when the leading end sensor 79 has detected the leading end 3a of the belt-shaped member 3. At this instant, the screw blocks 20 are spaced from each other by a maximum distance so that the distance between inner ends of the lower pawls 45 is longer than the width of the belt-shaped member 3 and the upper pawls 52 and the pressing members 66 have been raised.

After the hand 9 has been lowered until the belt-shaped member 3 has been positioned between the upper and lower pawls 52 and 45, the motor 23 is energized to rotate the screw shaft 19. In this manner, the screw blocks 20 and the grasping units 57 are moved in unison toward each other so that the lower pawls 45 penetrate a predetermined distance under the belt-shaped member 3.

After the hand 9 has been raised until the lower pawls 45 have abutted against the lower surface of the belt-shaped member 3, piston rods 50 of the cylinders 49 extend to lower the upper pawls 52. As a result, the side edges 3c and 3d of the leading end of the belt-shaped member 3 are grasped by the grasping units 57. Thereafter, correcting signals are fed from the control means 102 to both the motors 23. As a result the motors 23 are energized to cause both the guide blocks 21 and grasping units 57 to move a distance equal to the shifted distance above described in a direction opposite to the direction in which the belt-shaped member 3 is shifted relative to the forming drum 11.

The grasping units 57 are moved in the width direction of the belt-shaped member 3 in this manner to correct the position of the leading end of the belt-shaped member 3 in width directions to null the shifted distance, that is to say, so as to bring the position of the leading end of the belt-shaped member 3 in width directions and the reference position of the forming drum 11 into coincidence with each other. Such a correction of the position of the leading end of the belt-shaped member 3 in width directions may be carried out from the time when the grasping units 57 grasp the leading end of the belt-shaped member 3 to the time when the leading end of the member 3 is pressed against the forming drum 11 as later described.

Under this condition, the robot 5 is actuated to move the grasping units straight to the proximity of the forming drum 11 so that the leading end of the belt-shaped member 3 is transferred to the forming drum 11, while the belt-shaped member 3 is paid out of the conveyor 1 to be supplied to the forming drum 11. Thereafter, the piston rod 64 of the cylinder 63 is extended so that the center 3e of the leading end of the belt-shaped member 3 is pressed against the forming drum 11 by the pressing member 66, with the result that the belt-shaped member 3 is pressed against the forming drum 11 directly or indirectly through part of the member 3 already wound. In this case, as the position of the belt-shaped member 3 in width directions is corrected as above described and the member 3 is transferred being grasped by the grasping units 57, the position of the leading end of the member 3 and the reference position of the forming drum 11 are exactly kept in coincidence with each other.

Thereafter, the upper pawls 52 are raised under the condition of the member 3 being pressed against the forming drum 11 by the pressing members 66 so that the belt-shaped member 3 is released from grasping by the grasping units 57. Moreover, the piston rods 44 of the cylinders 41 are retracted to move the grasping units 57 away from each other to reduce contacting areas between the lower pawls 45 and the belt-shaped member 3. Then, after the belt-shaped member 3 is released from the suction holding of the pressing member 66, the piston rod 64 of the cylinder 63 is retracted to raise the pressing member 66.

The hand 9 is then moved to a position between the forming drum 11 and the conveyor 1 where the hand 9 does not detrimentally affect the belt-shaped member 3 when, being wound. When the forming drum 11 is then rotated, the belt-shaped member 3 on the conveyor 1 is supplied with its side edges being supported from below by the lower pawls 45 and is wound about the forming drum 11. During such a time, because the rollers 85 and 105 of the coincidence means 108 are forced against and in rolling contact with the side edges of the belt-shaped member 3, it is supplied to the forming drum with the position in the width directions being in coincidence with the reference position of the forming drum 11. As a result, the correction of position in the width directions as above described is not needed concerning the center of the belt-shaped member 3 in the longitudinal directions.

When the belt-shaped member 3 has been wound about a majority or most of the forming drum 11, its rotation is stopped. In this case, the trailing end of the belt-shaped member 3 still supported on the conveyor 1 is insufficiently supported. Therefore, even if the position of the trailing end of the member 3 in the width direction is brought into coincidence with the reference position of the forming drum 11 by means of the second coincidence mechanism 107, the trailing end of the member 3 is readily moved. Accordingly, the position of the trailing end of the member 3 is often shifted slightly from the reference position of the forming drum 11.

Thereafter, the motor 96 is energized to detect the ridge T of the belt-shaped member 3 or the position of the belt-shaped member 3 in the width positions by means of the detecting sensor, 95 in the same manner as above described. Results of this detection are fed to the control means 102 to obtain a shifted distance between the position of the trailing end of the belt-shaped member 3 in the width directions and the reference position of the forming drum 11.

Then, the hand 9 is moved rearward and stopped when the trailing end 3b is detected by the trailing end sensor 80. Thereafter, the piston rods 44 of the cylinders 41 are extended to force the lower pawls 45 deeply under the side edges 3c and 3d for preparation for elongation and contraction of the belt-shaped member 3 as a whole. The hand 9 is then raised to raise the trailing end of the belt-shaped member 3 by the lower pawls 45. The piston rods 50 of the cylinders 49 are extended to move the upper pawls 52 toward the lower pawls 45 so that the side edges 3c and 3d of the belt-shaped member 3 are grasped by the grasping units 57.

Thereafter, correcting signals are fed from the control means 102 to both the motors 23, the guide blocks 21 and the grasping units 57 are moved together a distance equal to the shifted distance in a direction opposite to the direction in which the belt-shaped member 3 is shifted relative to the forming drum 11 in the same manner as above described. When the grasping units 57 have been moved in the width direction of the belt-shaped member 3 in this manner, the position of the trailing end of the member 3 in the width direction is corrected to null the shifted distance or corrected so as to be in coincidence with the reference position of the forming drum 11. Moreover, such a correction of the position of the trailing end of the member 3 in the width directions may be effected from the time when the trailing end of the member 3 is grasped by the grasping units 57 from the time when the grasped portion of the member 3 is pressed against the forming drum 11.

Thereafter, the forming drum 11 is rotated under this condition to supply the trailing end of the member 3 being in coincidence with the reference position of the forming drum 11 so that the belt-shaped member 3 is wound directly about, the forming drum 11 or indirectly through the already wound part of the member 3 about the forming drum 11. During such an operation the grasping units 57 are moved while grasping the trailing end of the member 3 toward the top of the forming drum 11. If the belt-shaped member 3 is shorter, the hand 9 is moved slightly slower than s circumferential speed of the forming drum 11 so that the belt-shaped member 3 is subjected to tensile forces. On the other hand, if the member 3 is longer, the hand 9 is moved slightly faster than the circumferential speed of the forming drum 11 so that the belt-shaped member 3 is subjected to compression forces. In this manner the leading end 3a and the trailing end 3b exactly butt against each other. When the belt-shaped member 3 is wound one revolution about the forming drum 11, it is stopped.

Thereafter, after the grasping units 57 have been lowered so that the lower pawls 45 have arrived in the proximity of the forming drum 11, the piston rod 64 of the cylinder 63 is further extended. As a result, the center 3e of the trailing end, of the belt-shaped member 3 is forced against the forming drum 11 and pressed thereat. After the suction holding of the belt-shaped member 3 by the pressing member 66 has been stopped, the piston rod 64 of the cylinder 63 is retracted to raise the pressing member 66.

Thereafter, the piston rod 73 of the pin cylinder 72 is extended to cause the cylinder 63 to rock or swing about the pin 62 toward the conveyor 1. Such swinging is stopped when the pressing member 66 arrives at a joined portion of the belt-shaped member 3 or immediately above the leading end 3a and the trailing end 3b. The cylinder 63 is then actuated so as to lower the pressing member 66 to press the joined portion of the member 3, and then the pressing member 66 is raised or returned. In this manner the belt-shaped member 3 is wound one revolution about the forming drum 11. In this case, the positions of the leading and trailing ends in the width directions are corrected to bring both the ends in coincidence with the reference position of the forming drum 11 in the manner as above described. Therefore, the leading and trailing positions of the member 3 are coincident with each other without requiring any manual correction. As a result, the uniformity of tires produced is improved.

After the upper pawls 52 have been raised to release the belt-shaped member 3 from grasping by the grasping units 57, the motor 23 is energized to move the grasping units 57 away from each other and the hand 9 moves toward the conveyor 1. These movements of the grasping units 57 and the hand 9 are stopped when the lower pawls 45 contact only side edges of the trailing end 3b or corners of the belt-shaped member 3. The piston rods 50 of the cylinders 49 are then extended to lower the upper pawls 52 to grasp the corners of the trailing end of the member 3. At this moment, the piston rod 64 of the cylinder 63 is retracted to raise the pressing member 66.

Thereafter, the motor (not shown) is energized to rotate the gear 37 to cause the grasping units 57 to swing about the axis of the cylinders 41 through an angle, for example, of the order of 35–45° onto the side of the conveyor 1. As a result, only both the side edges of the trailing end 3b of the belt-shaped member 3 are elongated in the longitudinal direction to correct the shortage of the sides of the member 3. During such an elongation the center 3c of the belt-shaped member 3 is restrained by pressing the center to the forming drum 11 so that only the side edges are elongated.

The hand 9 is then lowered. As a result, the corners of the belt-shaped member 3 are pressed against the forming drum 11 by edges of the upper pawls 52 on the side of the robot 5 because of the upper pawls 52 being wider than the lower pawls 45. Under this condition the piston rods 44 of the cylinders 41 are retracted to remove the lower pawls 45 from the lower surface of the belt-shaped member 3.

The motor (not shown) is again energized to rotate the gear 37 to swing the upper pawls 52 into a horizontal position, while the hand 9 is moved toward the conveyor 9 so that the corners of the belt-shaped member 3 are pressed against the forming drum 11 somewhat under tensile forces by the upper pawls 52. As a result, the leading and trailing ends 3a and 3b of the belt-shaped member 3 are joined together to form a cylindrical tire constituting member.

Thereafter, the grasping units 57 are returned to their initial positions by operations of the motor 29, the cylinders 41 and 49 and the robot 5. The above is a one cycle of the first operation in the embodiment of the invention. This cycle is repeated continuously to form cylindrical tire constituting members successively.

A second embodiment of the invention will be explained hereinafter. Although the same apparatus as that in the first embodiment is used in the second embodiment, operations in the second embodiment are somewhat different from those in the first embodiment. First, the ridge T of the leading end of the belt-shaped member 3 on the conveyor 1 or position of the belt-shaped member in width direction is detected by the detecting sensor 95 and the detected result is fed to the control means 102. In this case, the control means only temporarily memorizes the position of the leading end in width directions, but does not obtain a shifted distance of the leading end as in the first embodiment.

After the leading end of the belt-shaped member 3 is grasped by the grasping units 57, the units 57 are moved toward the forming drum 11 to transfer the leading end of the belt-shaped member 3 without changing the position of the leading end of the member 3 so that the leading end is pressed on the forming drum 11.

The belt-shaped member 3 on the conveyor 1 is then supplied to the forming drum 11, while the forming drum 11 is rotated to wind the belt-shaped member 3 about a major part of the forming drum 11. During this operation the belt-shaped member 3 supplied to the forming drum 11 is exactly kept with its position in the width directions in coincidence with the reference position of the forming drum 11 by means of the coincidence means 108. Therefore, it is not needed to correct the position of the belt-shaped member 3 concerning the center of the member along the longitudinal direction.

The position of the trailing end of the belt-shaped member 3 in the width directions is then detected by the detecting sensor 95 in the same manner as above described. The detected result is fed to the control means 102 to obtain a shifted distance in the width directions between the memorized position of the leading end in the width directions and the now detected position of the trailing end in the width directions. After the trailing end of the belt shaped member 3 is grasped by the grasping units 57, the forming drum 11 is rotated, while the grasping units 57 is moved toward the forming drum 11 so that the trailing end of the member 3 is supplied to the forming drum 11.

At this instant, the grasping units 57 are moved in the width direction on the basis of signals from the control means 102 to correct the position of the trailing end of the belt-shaped member 3 in the width direction to null the shifted distance of the trailing end. In this manner the trailing end of the belt-shaped member 3 is wound about the forming drum 11 with the position in the width directions in coincidence with the position of the leading end in the width direction. When the belt-shaped member 3 has been wound one revolution about the forming drum 11, the winding is completed. At this time, positions of the leading and trailing ends of the belt-shaped member 3 in the width direction are coincident with each other without requiring any manual correction by an operator. Other operations are substantially similar to those in the first embodiment A third embodiment of the invention will be explained hereinafter. Operations in the third embodiment are somewhat different from those in the first embodiment, although the same apparatus is used in both the embodiments. First, the belt-shaped member 3 on the conveyor 1 is transferred until its leading end 3a arrives at a predetermined position in the proximity of the forming drum 11. At this time the position of the leading end of the member 3 is brought into coincidence with the reference position of the forming drum 11 by the second coincidence means 107. As a result, different from the first and second embodiments, it is not necessary to detect the position of the leading end of the belt-shaped member 3 by means of the detecting sensor 95.

After the leading end of the belt-shaped member 3 has been grasped by means of the grasping units 57, the grasping units 57 are moved toward the forming drum 11 to transfer the leading end of the member 3 without changing the position of the leading end in the width direction to press the leading end against the forming drum 11. Therefore, the leading end of the belt-shaped member 3 is pressed against the forming drum 11, while the position of the leading end in the width direction is kept coincident with the reference position of the forming drum 11.

Thereafter, while the belt-shaped member 3 on the conveyor 1 is being supplied onto the forming drum 3, the forming drum 11 is rotated so that the belt-shaped member 3 is wound about the major part of the forming drum 11. In this case, since the position of the belt-shaped member 3 in the width direction is brought exactly into coincidence with the reference position of the forming drum 11 by the coincidence means 108, the position of the member 3 in the width directions need not correct concerning the center of the member 3 along the longitudinal directions.

Thereafter, the leading end of the member 3 is wound about the forming drum 11. However, the leading end is likely to be deformed, so that it is difficult to control its position in the width positions exactly by the use of the second coincidence mechanism 107. Therefore, the position in the width directions is forcedly corrected in the following manner.

First the position of the trailing end of the belt-shaped member 3 is detected by the detecting sensor 95 and the detected result is fed to the control means 102. In the control means 102 a shifted distance in the width directions between the position of the trailing end of the member 3 in the width directions and the reference position of the forming drum 11 with the aid of the detected result.

After the trailing end of the belt-shaped member 3 has been grasped by the grasping units 57, the forming drum 11 is rotated, while the grasping units 57 are moved toward the forming drum 11 to supply the trailing end of the belt-shaped member 3 onto the forming drum 11. At this moment, the grasping units 57 are moved in the width direction on the basis of a signal from the control means 102 to forcedly correct the position of the trailing end of the belt-shaped member 3 in the width directions to null the shifted distance. In this manner the trailing end of the member 3 is wound about the forming drum 11 in a manner with reference position being in coincidence with the position of the trailing end in the width directions.

When the belt-shaped member 3 has been wound one revolution about the forming drum 11, the wounding operation is completed. At this time, the positions of the leading and trailing ends of the member 3 in the width directions are coincident with each other without requiring any manual correction so that the uniformity of a produced tire is also improved. Other operations in this embodiment are the substantially similar to those in the first embodiment.

In these embodiments, the conveyor 1 is constructed by a number of freely rotating rollers. However, it may be constructed by a conveyor belt forcedly driven by a motor and the like. Moreover, the reflection type photoelectric sensor is used as the sensors in the above embodiments. However, contact type sensors may be used so long as they are able to detect positions of the belt-shaped member 3 in the width directions.

Although the center position of the member 3 is detected by detecting the ridge T by the use of the detecting sensor 95 in the embodiments, the center position may be detected by obtaining a mid position between side edges of the member 3 detected by detecting sensors such as transmission type photoelectric sensors. Furthermore, although the upper and lower pawls 52 and 45 are moved toward and away from each other by raising or lowering the upper pawls 52 in the above embodiments, the lower pawls 45 may be moved in the vertical direction or both the upper and lower pawls 52 and 45 may be moved.

While the invention has been particularly shown and described with reference to preferred embodiments thereof, it will be understood by those skilled in the ar that the foregoing and other changes in form and details can be made therein without departing from the spirit and scope of the invention.

What is claimed is

1. A method of winding a belt-shaped member around a forming drum comprising steps of: detecting a position of a leading end of a belt-shaped member in width directions to obtain a shifted distance between a predetermined reference position of a forming drum and the detected position of the leading end of the belt-shaped member, grasping opposite side edges of the leading end of the belt-shaped member by means of lower pawls and upper pawls of grasping units, transferring the leading end of the belt-shaped member grasped by means of the lower and upper pawls of the grasping units to the forming drum, carrying out a correction of the position of the leading end of the belt-shaped member in width direction to null the shifted distance by means of the rasping unit at any time and anywhere from the time when the grasping unit grips the leading end of the belt-shaped member to the time when the leading end of the member is pressed against the forming drum, pressing the leading end of the belt-shaped member against the forming drum after bringing the position of the leading end in the width directions into coincidence with the reference position of the forming drum, rotating the forming drum during which the belt-shaped member is supplied onto the forming drum to wind the belt-shaped member around a majority of the forming drum, detecting a position of a trailing end of the belt-shaped member in the width direction to obtain a shifted distance of the trailing end in the width directions relative to the reference position of the forming drum, supplying the trailing end of the belt-shaped member onto the rotating forming drum while moving the trailing end in a width direction to null the shifted distance of the trailing end before transfer to the trailing end to the forming drum is completed, thereby winding said belt-shaped member around the forming drum with the position of the trailing end in the width direction being in coincidence with the reference position of the forming drum, with resulting coincidence of the positions of the leading and trailing ends of the belt-shaped member in the width directions, elongating only both side edges of the trailing end of the belt-shaped member in the longitudinal direction by grasping the side edges by means of the lower and upper pawls of the grasping unit while restraining the center of the belt-shaped member by pressing it to the forming drum to correct shortage of the sides of the belt-shaped member, and joining the leading and trailing ends together over the whole width thereof to form a cylindrical tire constituting member.

2. A method of winding a belt-shaped member around a forming drum comprising the steps of; detecting a position of a leading end of a belt-shaped member in width directions, grasping opposite side edges of the leading end of the belt-shaped member by means of lower pawls and upper pawls of grasping units, transferring the leading end to the forming drum by said grasping unit and pressing it against the forming drum, rotating the forming drum during which the belt-shaped member is supplied onto the forming drum to wind the belt-shaped member around a majority of the forming drum, detecting a position of a trailing end of the belt-shaped member in the width directions to obtain a shifted distance between the positions of the leading and trailing ends in the width directions, supplying the trailing end of the belt-shaped member onto the rotating forming drum, while moving the trailing end in a width direction to null the shifted distance between the positions of the leading and trailing ends and thereby winding the trailing end around the forming drum with the coincidence of the positions of the leading and trailing ends of the belt-shaped member, elongating only both side edges of the trailing end of the belt-shaped member in the longitudinal direction by grasping the side edges by means of the lower and upper pawls of the grasping unit while restraining the center of the belt-shaped member by pressing it to the forming drum to correct shortage of the sides of the belt-shaped member, and joining the leading and trailing ends together over the whole width thereof to form a cylindrical tire constituting member.

3. A method of winding a belt-shaped member around a forming drum comprising the steps of; transferring a leading end of a belt-shaped member by grasping opposite side edges of the leading end, pressing the leading end against the forming drum after bringing the leading end into coincidence with a reference position of a forming drum, rotating the forming drum during which the belt-shaped member is supplied into the forming drum to wind the belt-shaped member around a majority of the forming drum, detecting a position of a trailing end of the belt-shaped member in width directions to obtain a shifted distance in the width directions between the position of the trailing end in the width directions and the reference position of the forming drum, supplying the trailing end of the belt-shaped member onto the rotating forming drum while shifting the trailing end in a width direction to null the shifted distance between the position of the trailing end and the reference position of the forming drum thereby winding the shifted trailing end around the forming drum with a coincidence of the position of the trailing end in the width directions and the reference position of the forming drum with resulting coincidence of the positions of the leading and trailing ends of the belt-shaped member in the width directions, elongating only both side edges of the trailing end of the belt-shaped member in the longitudinal direction by grasping the side edges by means of the lower and upper pawls of the grasping unit while restraining the center of the belt-shaped member by pressing it to the forming drum to correct shortage of the sides of the belt-shaped member, and joining the leading and trailing ends together over the whole width thereof to form a cylindrical tire constituting member.

* * * * *